United States Patent [19]

Seymour et al.

[11] Patent Number: 5,436,086
[45] Date of Patent: Jul. 25, 1995

[54] PROCESSING OF FUEL GASES, IN PARTICULAR FOR FUEL CELLS AND APPARATUS THEREFOR

[75] Inventors: Clive M. Seymour, Swarthmoor, Nr. Ulverston; Robert A. J. Dams, Arundel; Ian Palmer, Barrow-in-Furness; Stephen C. Moore, Denmead, all of United Kingdom

[73] Assignees: Vickers Shipbuilding & Engineering Limited, Cumbria; CJBD Limited, Hampshire, both of United Kingdom

[21] Appl. No.: 151,381
[22] Filed: Nov. 12, 1993
[30] Foreign Application Priority Data Nov. 11, 1992 [GB] United Kingdom ............... 9223660

[51] Int. Cl.$^6$ ............................................. H01M 8/06
[52] U.S. Cl. ...................................... 429/17; 429/19; 429/34
[58] Field of Search .......................... 429/19, 17, 34

[56] References Cited

U.S. PATENT DOCUMENTS 4,046,956  9/1977  Fanciullo .
4,910,099  3/1990  Gottesfeld .

FOREIGN PATENT DOCUMENTS 1305212  7/1992  Canada .
WO92/10009  6/1992  European Pat. Off. .
2132108  7/1984  United Kingdom .

OTHER PUBLICATIONS

Patent Abstracts of Japan, vol. 15, No. 470, 28 Nov. 1991 & JP-A-03 203 165, 4 Sep. 1991.
Proceedings of the 26th Intersociety Energy Conversion Engineering Conf., J. C. Amphlett et al., "Some Design Considerations . . . ", p. 647, Aug. 1991.
Patent Abstracts of Japan, vol. 15, No. 500, 18 Dec. 1991 & JP-A-03 218 903, 26 Sep. 1991.

Primary Examiner—John S. Maples
Attorney, Agent, or Firm—Larson and Taylor

[57] ABSTRACT

An apparatus for processing fuel gases, in particular for a fuel cell, includes primary and secondary catalytic oxidation means for the oxidation of carbon monoxide in a reformed fuel gas flow. Small quantities of oxygen required for the secondary oxidation are provided by passing the oxygen through a first oxygen permeable membrane. The oxygen may be supplied as air, pure oxygen or an oxygenated solution. An oxygen fuel supply to the fuel cell may additionally be humidified by allowing water to pass from a water flow across a further membrane into the oxygen supply. Oxygen passing across the further membrane in the opposite sense to the water may serve to oxygenate the water for supplying to the first membrane.

31 Claims, 7 Drawing Sheets

PROCESSING OF FUEL GASES, IN PARTICULAR FOR FUEL CELLS AND APPARATUS THEREFOR

The present invention relates to the processing of fuel gases, in particular to the processing of fuel gases for a fuel cell, including the removal of contaminant gases.

The basic technology of fuel cells is now well known. Of the various possible fuel cell reactions and reaction substrates, a commonly preferred reaction is that between hydrogen and oxygen on a polymer substrate using a catalyst such as a platinum based catalyst. This reaction may be expressed as:

$$H_2 + \tfrac{1}{2}O_2 \rightarrow H_2O + \text{heat} \qquad (A)$$

In order to remove the heat produced, the fuel cell stack is cooled and thus the product water is largely in the liquid phase.

The oxygen may be supplied to the fuel cell as either the pure gas or in air, but must in either case be humidified, since the reaction substrate can lose its reactivity if not kept thoroughly moist.

A preferred route for obtaining the reactant hydrogen fuel gas is by the now well established method of reforming hydrocarbon fuels or their alcohol analogues. Where the fuel cell is required to provide power for a fixed installation, such as a building, a gaseous hydrocarbon such as methane may be suitable. Alternatively, where power from the fuel cell is required for a mobile installation such as in a land vehicle, marine vessel or the like, liquid fuels, such as methanol can be used. The overall reaction scheme for the reforming of methanol can be expressed as:

$$CH_3OH + H_2O + \text{heat} \rightarrow 3H_2 + CO_2 \qquad (B)$$

However, scheme (B) is, in fact, an idealised summation of several reactions which occur in practice. Another reaction which occurs is:

$$CH_3OH + \text{heat} \rightarrow 2H_2 + CO \qquad (C)$$

The carbon monoxide produced in this reaction is a contaminant byproduct and will become adsorbed on the catalyst in particular where a platinum based catalyst is used. The carbon monoxide may be removed from the reformed fuel gas by oxidation according to the reaction:

$$CO + \tfrac{1}{2}O_2 \rightarrow CO_2 + \text{heat} \qquad (D)$$

Reaction (D) may be achieved by adding oxygen or air to the fuel gas immediately upstream of the fuel cell. Reaction (D) will then occur in the fuel cell itself, whilst the carbon monoxide is adsorbed on the platinum catalyst, and carbon dioxide will be liberated. Line 1 of FIG. 1 illustrates how, in the prior art where there is no addition of extra oxygen, the voltage produced by the fuel cell falls with time as the catalyst becomes progressively more poisoned with adsorbed carbon monoxide. Addition of oxygen stabilises the voltage with time, as illustrated by line 2, although in the long term there may be a minor voltage fall (3) due to the effect of other impurities. In this method, a fairly large quantity of oxygen of approximately 2% by volume must typically be added in order to ensure complete removal of the carbon monoxide.

In a preferred known method, the reformed fuel gas is purified by means of a catalytic oxidation of the carbon monoxide and adsorption of unreformed fuel. Unfortunately, these measures are not totally effective and some carbon monoxide remains in the reformed fuel gas. Typically the amount of carbon monoxide is less than 10 parts per million (ppm) (under steady state conditions) but this will still result in a small voltage drop off, as illustrated by line 1A in FIG. 1.

It is thus apparent that some oxygen must be added even in this preferred method to effect complete oxidation of the carbon monoxide and thereby to minimise the voltage drop off. For about 10 ppm of carbon monoxide, the quantity of oxygen required is of the order of 10–30 ppm; this amount will provide a sufficient excess to ensure that all the carbon monoxide is removed in a reasonable timescale. Excess oxygen reacts with hydrogen to form steam.

Whilst it is possible to add oxygen at the rate of 1 to 2% which is required for unpurified feeds, it is difficult to meter the steady oxygen concentration at levels which are needed to eliminate the lower levels of residual carbon monoxide achievable after purification.

From the above it can be seen that there is needed a method of adding very small quantities of air or oxygen to the reformed fuel gas thereby to remove residual carbon monoxide and to optimise the production of electrical power from a fuel cell. If too great an excess of oxygen is added, too much oxygen will react with hydrogen fuel thereby reducing overall efficiency of the fuel cell.

According to a first aspect of the invention there is provided an apparatus for processing fuel gases, in particular for a fuel cell, comprising:

first oxidation means, including a first catalyst, for effecting primary selective catalytic oxidation of carbon monoxide in a reformed fuel gas flow, second oxidation means, including a second catalyst, for effecting secondary selective catalytic oxidation of residual carbon monoxide in the reformed fuel gas flow and, a first oxygen permeable membrane and means for supplying oxygen to the membrane, wherein the first oxygen permeable membrane is in intimate contact on a first side thereof with the reformed fuel gas before the reformed fuel gas enters the second oxidation means and is in intimate contact on a second side thereof with the oxygen supply.

In an embodiment of this aspect of the invention the first oxygen permeable membrane is disposed intermediate the first and second oxidation means and the apparatus further includes a second oxygen permeable membrane disposed upstream of the first oxidation means and a means for supplying oxygen to the second permeable membrane, wherein a first side of the second permeable membrane is in intimate contact with the reformed fuel gas and the second side of the second permeable membrane is in intimate contact with the oxygen supply.

In a further embodiment of this aspect of the invention, the first catalyst is adapted to adsorb carbon monoxide preferentially with regard to hydrogen. Thus, the carbon monoxide is oxidised preferentially on this catalyst with regard to the oxidation of hydrogen. A catalyst comprising a mixture of noble metals and appropriate metallic compounds is particularly suitable.

In another embodiment of this aspect of the invention, the second catalyst is the catalyst in the fuel cell. This catalyst is desirably a platinum-based catalyst.

In a still further embodiment of this aspect of the invention, the oxygen supply is in the form of a solution of oxygen in an appropriate liquid and this oxygenated liquid is in intimate contact with the second side of the first oxygen permeable membrane. In this embodiment, oxygenated liquid passes through the membrane. Preferably the liquid is water which evaporates on passing through the membrane, thereby serving to humidify the reformed fuel gas in addition to providing the oxygen supply for the secondary selective oxidation. In order to prevent ionic contamination of the surface of the membrane, pure water is preferred. Most preferably, the pure water is supplied from that produced in the fuel cell.

In a yet further embodiment of this aspect of the invention, the apparatus further includes means for humidifying the oxygen supply to the fuel cell, the means comprising a third oxygen permeable membrane in intimate contact on a first side thereof with the oxygen supply to the fuel cell and in intimate contact on the second side thereof with water. The oxygen supply to the fuel cell may be in the form of air or substantially pure oxygen. Thus, in this embodiment water passes across the third oxygen permeable membrane from the second side to the first side and evaporates into the oxygen supply to the fuel cell.

In a variation of this embodiment, the apparatus may also be adapted to oxygenate a water flow in order to provide a vehicle for the oxygen supply to the reformed fuel, for the secondary, and optionally for the primary, oxidation of carbon monoxide in the reformed fuel. Thus, in this variation, the third oxygen permeable membrane is in intimate contact on its first side with the oxygen supply to the fuel cell and on its second side is in intimate contact with the water forming the oxygen supply to the first, and optionally the second, permeable membrane. In this variation, therefore, water passes across the third permeable membrane from the second side to the first side whilst oxygen passes across the said membrane from the first side to the second side, thereby to oxygenate the water. In other words, oxygen from the oxygen supply to the fuel cell dissolves in the water passing across the third permeable membrane and diffuses across the said membrane in the opposite direction to that of the water and is dissolved in the bulk water on the second side.

In a preferred variation of this embodiment, the humidification of the oxygen supply to the fuel cell and of the reformed fuel gas, the oxygenation of the water and the supply of oxygen to the secondary catalytic oxidation may be effected in a single stage. In this preferred variation, the first membrane and the third membrane are in intimate contact on their respective second sides with the water flow. In this way, a single water flow permits passage of water across the first and third membranes to humidify the reformed fuel gas flow and the oxygen supply to the fuel, whilst oxygen from the oxygen supply to the fuel cell passes across the third permeable membrane from its first to its second side and is dissolved in the water. The dissolved oxygen can then pass from the water flow across the first permeable membrane from its second to its first side to provide the necessary oxygen for the secondary, and optionally for the primary, catalytic oxidation of the carbon monoxide.

In one preferred arrangement of the apparatus according to this variation, a humidifier for the oxygen supply to the fuel cell (including the third membrane) is placed upstream of the humidifier for the reformed fuel gas (including the first membrane). The same water flow passes through each humidifier. Hence, the water becomes oxygenated on passing through the humidifier for the oxygen supply to the fuel cell and both oxygen and water are discharged into the reformed fuel gas flow in the downstream humidifier, by passing across the first permeable membrane.

In a second preferred arrangement of the apparatus according to this variation, only a single humidifier is provided to effect humidification of both the oxygen supply to the fuel cell and the reformed fuel gas flow wherein the water flows in a space defined between first and third membranes. In this arrangement, the third membrane separates the water flow from the oxygen supply to the fuel cell and the first membrane separates the same water flow from the reformed fuel gas. Oxygen thereby diffuses into the water, through the third membrane, is dissolved in the single water flow and further diffuses through the first membrane into the fuel gas. An example of such an arrangement comprises a generally concentric cylindrical annular arrangement of the membranes with the reformed fuel gas in the central core separated from an annular water flow by the first membrane and the water flow in turn being separated from the oxygen supply to the fuel cell, in a further annulus, by the third membrane. Thus annular first and third membranes separate the water from the respective gas flows. Preferably the oxygen supply to the fuel cell is in the outer annulus as this provides a larger membrane area for diffusion of oxygen inwards into the water.

The rates of transfer of water and oxygen across the first and third permeable membranes may be varied relative to each other by appropriate selection of the type of membrane and/or of the pressure difference across each membrane.

Optionally the supply of oxygen in the water flow may be supplemented, by sparging air or oxygen into said water upstream of the reformed fuel gas humidifier, or of the single humidifier.

According to a second aspect of the present invention there is provided a method of processing fuel gas for a fuel cell including the steps of (i) primary selective catalytic oxidation of carbon monoxide in a reformed fuel gas flow (ii) secondary selective catalytic oxidation of remaining carbon monoxide in the reformed fuel gas flow, wherein small pre-determined quantities of oxygen for the secondary selective catalytic oxidation are provided by passing the reformed fuel gas over a first side of a first oxygen permeable membrane, providing an oxygen supply on the second side of the said membrane and allowing oxygen to diffuse across the said membrane into the reformed fuel gas.

In an embodiment of this aspect of the invention, the method further comprises providing pre-determined quantities of oxygen for the primary selective catalytic oxidation by passing the reformed fuel gas over a first side of a second oxygen permeable membrane, providing an oxygen supply on the second side of the said second membrane and allowing oxygen to diffuse across the membrane.

In other embodiments of this aspect of the invention the catalyst in the primary selective oxidation is adapted to adsorb carbon monoxide preferentially with respect to hydrogen and the catalyst in the secondary selective oxidation is the catalyst in the fuel cell. The oxygen may be supplied to the second side of the first (and optionally the second) membrane by means of an oxygenated liquid, preferably water and most preferably pure water supplied from that produced by the fuel cell. In this manner, oxygen can diffuse from the oxygenated water across the first membrane into the reformed fuel gas and also, water can diffuse across the first membrane in order to humidify the reformed fuel gas.

Further embodiments of this aspect of the invention additionally provide a method of humidifying the oxygen supply to the fuel cell in which the oxygen supply to the fuel cell (which may be in the form of air or substantially pure oxygen) is in intimate contact with a first side of a third oxygen permeable membrane, the second side of which is in intimate contact with water, allowing water to pass across the membrane. In variations of this method, oxygen may simultaneously pass across the third membrane to oxygenate the water.

BRIEF DESCRIPTION OF THE DRAWINGS

For a better understanding of the invention, and to show how the same may be carried into effect, reference will be made, by way of example only, to the following drawings, in which:

Referring now to FIG. 4 in which there is shown a block diagram of the fuel cell and processing cycle. A hydrocarbon fuel, such as for example, methanol, is reformed 4, in the presence of water 5 by the addition of heat 6 using a catalyst. After leaving reformer 4, the product gases pass though a purifying system consisting of a catalytic selective carbon monoxide oxidation means 8 followed by an activated carbon bed 7 to remove unwanted hydrocarbons. Air or oxygen is added 9 by means of control valve 9A to the catalytic oxidiser to remove the carbon monoxide in accordance with equation D. Other purification stages, further beds of activated carbon or ion exchange columns may also be used, but are not shown. After cooling 10 to condense any residual water vapour 5, the gas is humidified 11 and passed to fuel cell 12.

The quantities (or partial pressures) of the product gases leaving reformer 4 and carbon bed 7 are shown in boxes 4A and 7A respectively. Not shown in box 4A is the presence of small amounts of hydrocarbons which may occur because either they have not reacted from the hydrocarbon fuel or they have been converted to unwanted byproducts; these are removed in the purification process 8, 7. The best level of purification presently attainable in practice on a working installation is 10 ppm or less of carbon monoxide under steady state conditions and 30 ppm during transients from one fuel cell power output level to another.

Figure 1:
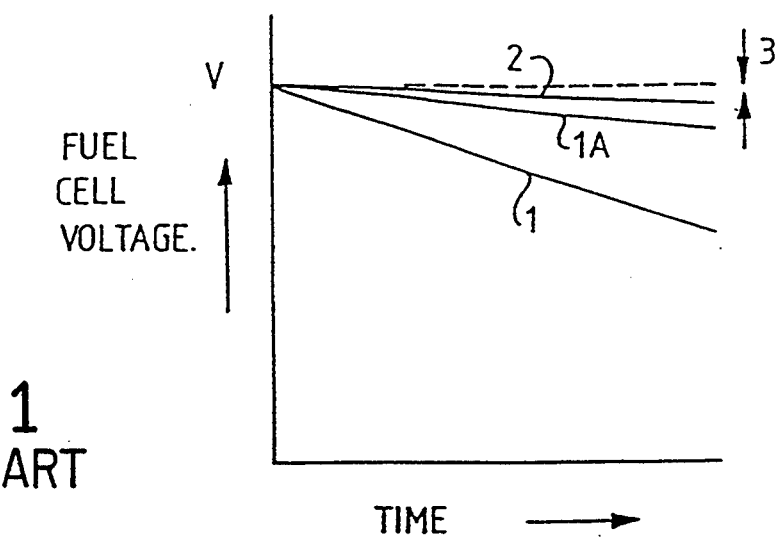
FIG. 1 is a plot of fuel cell output voltage against time (partly prior art).

However, even these low levels of impurity have a cumulative effect on the voltage (or power) output of the fuel cell as carbon monoxide molecules are adsorbed onto active catalytic sites and thus block them for hydrogen atoms. Such a progressive poisoning of the catalyst is illustrated by curve 1A in FIG. 1.

Air or oxygen is filtered 13, humidified 14 and passed to fuel cell 12. The fuel cell reaction A produces heat and pure steam/water. This is condensed and cooled 15. Part of the fuel cell water output is used for cooling cell 12 via cooler 15, part for humidification 11, 14 of the reactants and part 5 for the reforming reaction 4 (see FIG. 8). There is a net production of water in the process; most of this surplus is lost as vapour in the air discharge 16 or fuel purge or burn 17.

As has been stated, purification stages 8 and 7 result in a small residue to carbon monoxide. This is typically about 3 ppm under steady state conditions but can rise to about 30 ppm during transients. If no such purification stages are present, the carbon monoxide concentration is typically 1,000 to 5,000 ppm; the conventional method of removing such carbon monoxide is to add air or oxygen for example as shown by dashed line 18 by means of control valve 18A so that the carbon monoxide is selectively oxidised in the fuel cell 12 which serves as a second oxidation means. Whilst it is possible to add oxygen at the rate of 1 to 2% which is required for unpurified feeds, it is difficult to meter the steady oxygen concentration at levels which will be needed to eliminate the lower levels of residual carbon monoxide achievable after purification.

In the embodiment illustrated, the required 5–10 ppm of oxygen is added to the reformed fuel gas upstream of the fuel cell 12 via the water used for humidification. This can be either by means of a combined air and fuel humidifier 19 (FIG. 5) or by means of consecutive humidifiers 14A and 11A (FIG. 6) with the air humidifier 14A upstream of the fuel humidifier 11A. The principle of the invention will now be described with reference to the particular embodiments illustrated in the figures.

Figure 6:
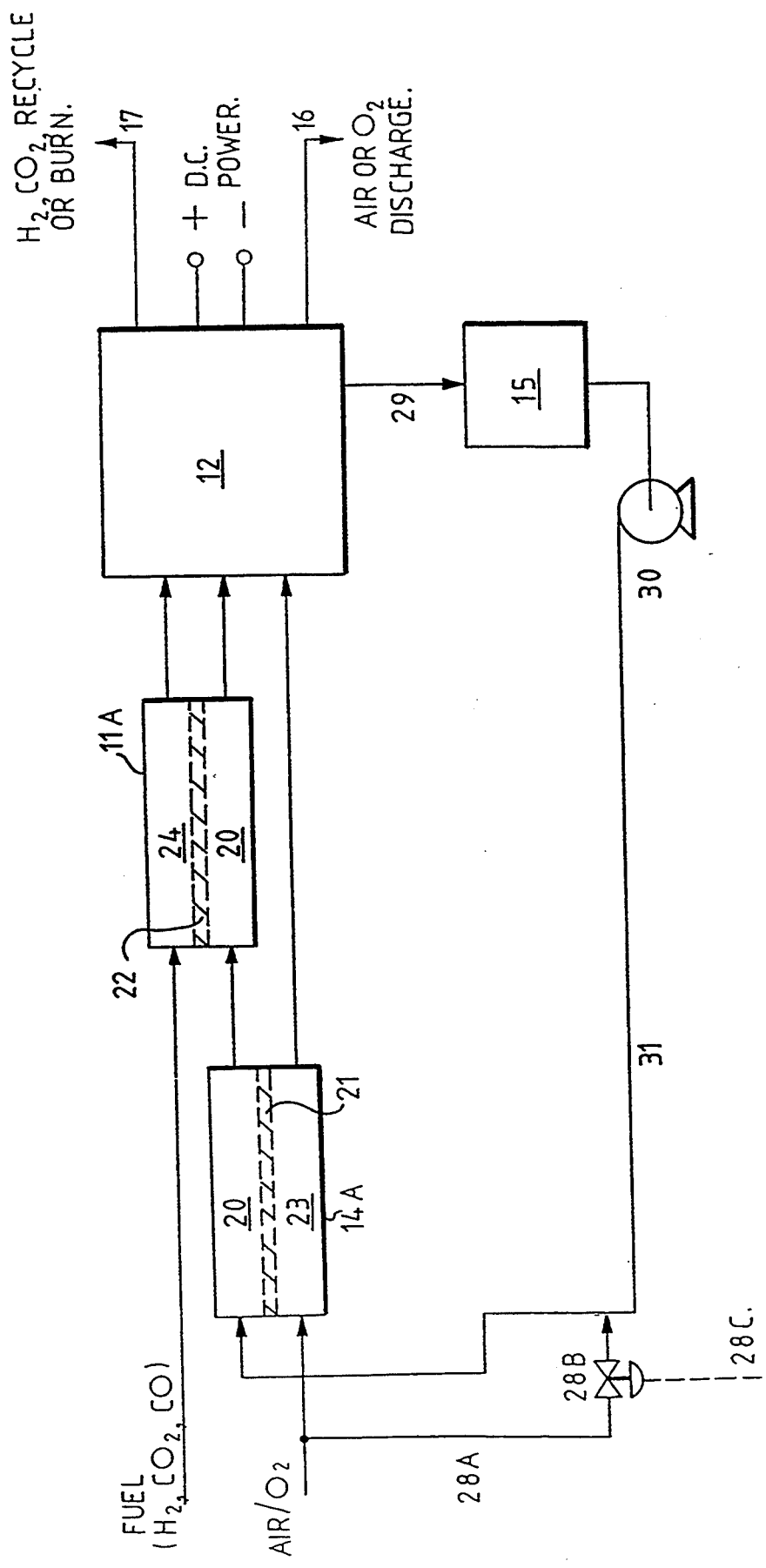
FIG. 6 is a further variation of the flow diagram in FIG. 4 showing consecutive air and fuel humidifiers.
Figure 7:
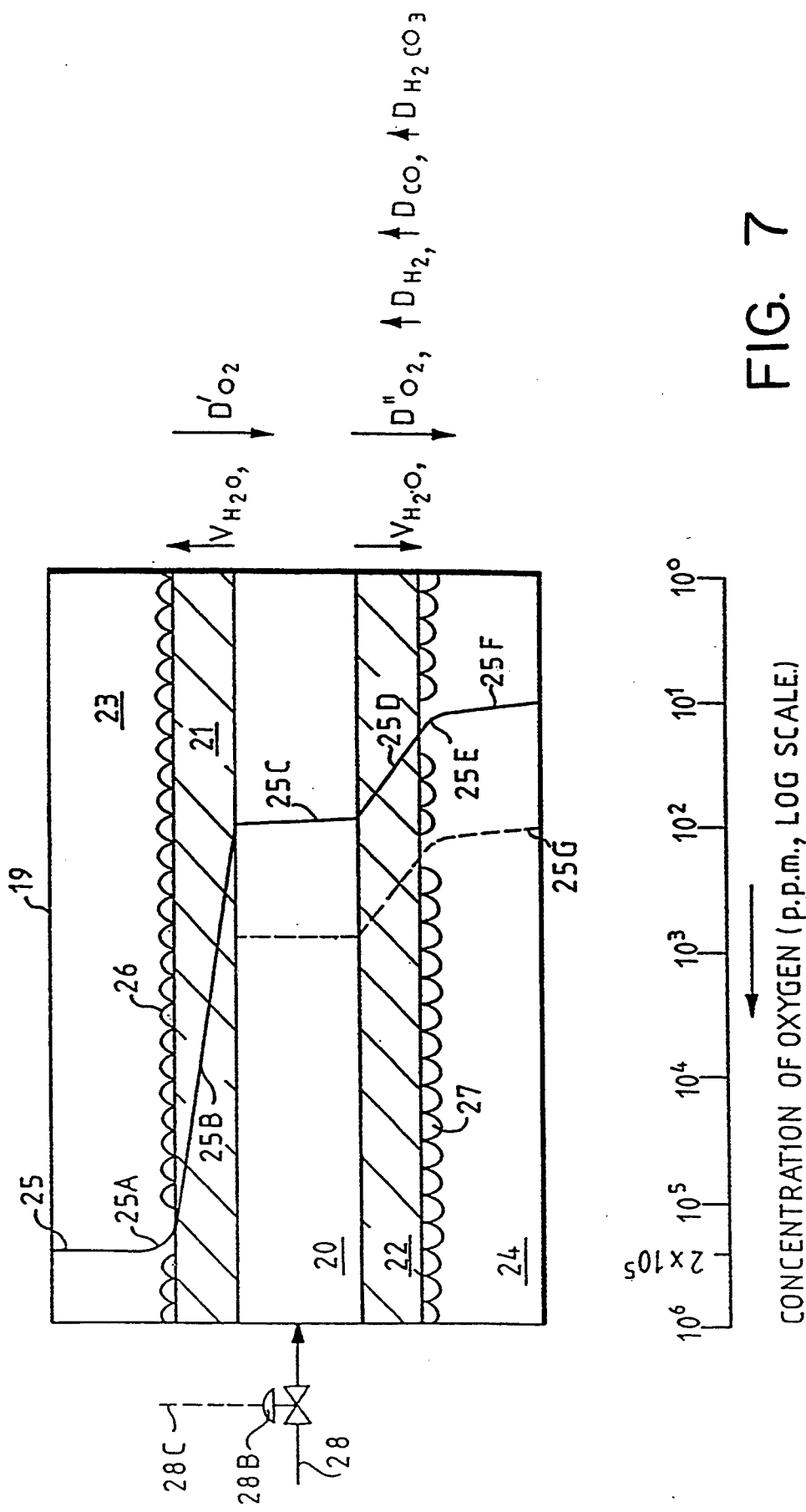
FIG. 7 is a sectional elevation through the combined humidifier 19 shown in FIG. 5. Superimposed in the elevation are profiles of the oxygen concentration across the humidifier.

In FIG. 7, a central passage 20 for water is, at least in part, defined by first and third hydrophilic membranes 22,21. Ionic polymer membranes are ideal for this application as they are porous to both water and oxygen. Air, or oxygen, flows in passage 23 and reformed fuel gas flows in passage 24. The air, reformed fuel gas, and/or water flows may be co-current or counter-current, as convenient. All flows are shown as co-current in FIGS. 5 and 6, as this is most convenient in the arrangement herein described but this is not essential. Superimposed on FIG. 7 is an oxygen concentration gradient 25 based on the assumption that air is flowing in passage 23. If pure oxygen were to be used, the partial pressure of oxygen would be 1,000,000 ppm ($1 \times 10^6$).

The concentration of oxygen in air is about 20%, i.e. 200,000 ppm ($2 \times 10^5$) (25). There is a boundary layer effect 25A as the gas dissolves in the water droplets 26 on the surface of membrane 21. The dissolved gas diffuses though membrane 21 at a rate $D'O_2$. Initially, when there is no oxygen in the water, the diffusion rate can be expressed as:

$$D'O_2 \, \alpha \, \frac{[20,000 - 0]}{\text{Thickness of membrane 21}} \quad \text{(neglecting effects of boundary layer 25A)}$$

At steady state, when the oxygen concentration in the water is, say 100 ppm ($10^2$), the rate will drop marginally to:

$$D'O_2 \, \alpha \, \frac{[20,000 - 100]}{\text{Thickness of membrane 21}}$$

It will be noted that the diffusion of oxygen through membrane 21 is in the opposite direction to the flow of water, indicated by $V.H_2O$. Thus, the net transport of oxygen through membrane 21 may be indicated by the expression:

$$D'O_2 - V.H_2O$$

(Although the units above are not consistent, the expression is indicative of the opposing factors).

Because of the high concentration gradient and low water velocity in membrane 21, the above expression has a positive value. The efficiency of the invention may be decreased if high oxygen concentrations are required in the water. The water velocity $V.H_2O$ may be controlled by varying the pressure differential between the water passage 20 and air passage 23 and/or the nature of membrane 21. However, an increase in surface area of membrane 21 will allow the movement of the required amount of water 26 into the air flow in passage 23 at a lower velocity through membrane 21. The opposing effect of the two factors in the above expression is indicated by the shallow concentration gradient 25B in FIG. 1.

Neglecting boundary layer effects, concentration gradient 25C is steep, because of the flow of water in passage 20 and its inherent turbulence. Transport of oxygen ($D''O_2$) through membrane 22 is assisted by the flow of water according to the expression:

$$D''O_2 + V.H_2O$$

Although the absolute value of $D''O_2$ in membrane 22 is less than $D'O_2$ in membrane 21 because of the lower concentration gradient, the net flow of oxygen through the membrane 22 is rapid due to the additive effect of the water velocity, this is indicated by the steeper gradient 25D, compared to that of 25B.

After allowing for boundary effects 25E, there is a resultant concentration of oxygen of about 5-10 ppm in reformed fuel gas passage 24. This level remains substantially constant during transients since the net effect of changing the fuel cell power output is caused by changes in pressure of the reactant gas in the fuel cell. The pressure differentials between passages 23–20 and 24–20 remain in the same ratio to each other during transients and thus the rate of oxygen diffusion does not change significantly.

As an inert gas in this process, the diffusion of nitrogen has not been considered. However, diffusion of the reformed fuel gas and impurities should be considered. Hydrogen and carbon monoxide are less soluble in water than oxygen and so, despite large concentration gradients, diffusion rates are low relative to the water velocity $V.H_2O$ so that neither gas reaches water passage 20 in significant quantities. Carbon dioxide, in contrast, is highly soluble forming carbonic acid which ionises to give $H^+$ cations and $CO_3^{2-}$ anions Membrane 22 is preferably an ionic polymer membrane in which the ions are fixed in the polymer matrix. As the carbonate ion is physically large, it has difficulty passing through the interstices of the matrix, particularly as its progress is hindered by the presence of negatively charged ions in the matrix and water molecules moving in the opposite direction. Thus there is no effective transport of carbonic acid into water passage 20.

Figure 5:
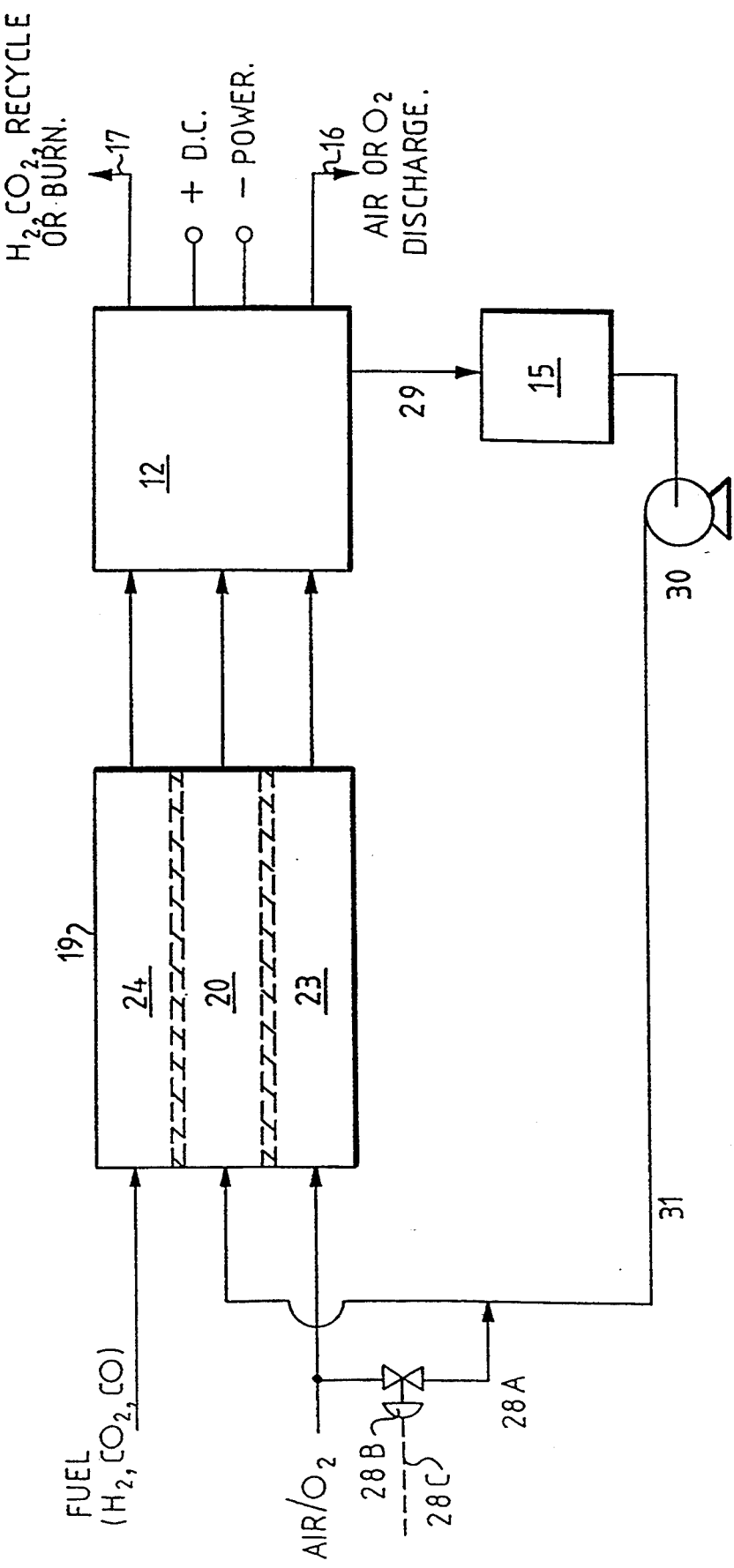
FIG. 5 is a variation of part of the flow diagram in FIG. 4 showing a combined fuel and oxygen humidifier.

In the event that there is an insufficient transfer of oxygen into the reformed fuel gas in passage 24, air or oxygen may be sparged 28 directly into the water in passage 20, or upstream of it 28A (FIG. 5). This may be useful at start-up times or for particularly large transients. Though sparging will have a minimal effect on oxygen gradient 25B, it may easily double oxygen gradient 25D. The result of sparging is effectively to shift the concentration gradient 25C, D, E and F to the left, for example as shown by the dashed line 25G. Sparge 28, or 28A, may be used during the whole period of the fuel cell operation, if required, or intermittently during transients when an automatic control system could signal (28C) when operation (28B) was necessary.

FIG. 5 shows a diagrammatic representation of the combined humidifier 19 in the coolant water recycle to fuel cell 12. Cooling water 29 from fuel cell 12 is cooled 15 and recycled 30, via a sparge 28A and humidifier 19, back to the fuel cell. In FIG. 6, two separate humidifiers 14A and 11A are used with the air or oxygen humidifier 14A upstream of the fuel gas humidifier 11A so that oxygen dissolves in water 20 and can then diffuse into reformed fuel gas passage 24.

Figure 8:
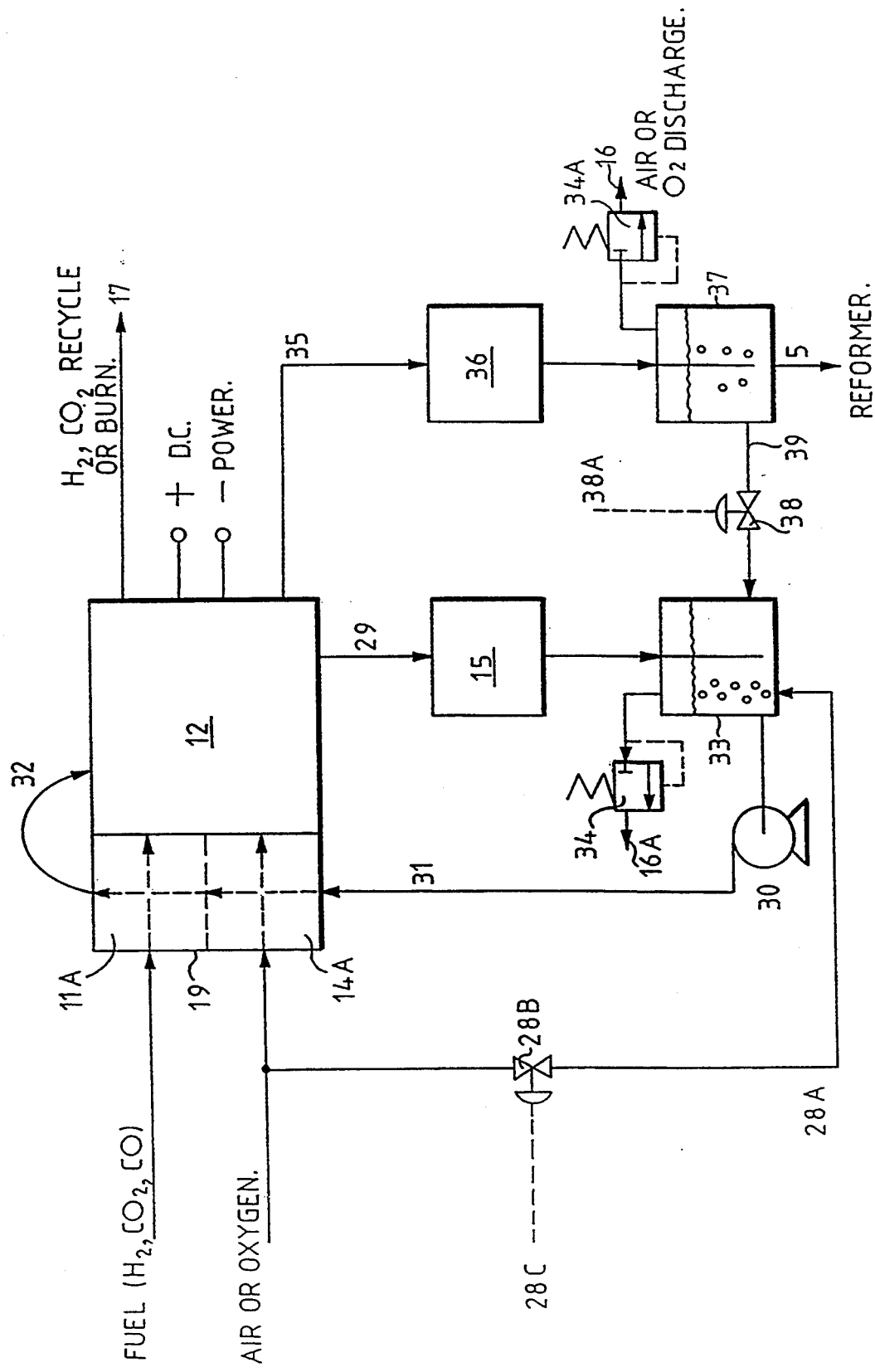
FIG. 8 is a flow diagram showing the humidification of the fuel gases for the fuel cell 12 and the associated water cycle.

FIG. 8 shows a variation of FIG. 5. Here, separate humidifiers 14A and 11A are in the same housing 19 and recycle water 31 passes via air humidification (and oxygen absorption) 14A to fuel humidification (and oxygen desorption) 11A and thence, via pipe 32, into fuel cell 12. In practice, pipe 32 would be an internal connection, but it is shown thus in FIG. 7 to emphasise its presence together with the flow of water (shown dashed) consecutively through humidifiers 14A and 11A.

Coolant water leaves fuel cell 12 via pipe 29, is condensed and cooled 15 and collected 33 from whence it is recycled 30 via pipe 31. In this variation, sparge 28A bubbles into reservoir 33. Unabsorbed gas leaves 16A via pressure relief valve 34. Waste air from fuel cell 12 is discharged 16 via pressure relief valve 34A.

The actual water 35 produced by cell 12 is cooled 36 and collected 37. Most is passed to reformer 5, but there is a make up via control valve 38 in pipe 39 to reservoir 33. The make up is to replace that lost by transfer to the gases in the humidifiers 11A, 14A or 19 and via purge 34. Automatic control 38A operates valve 38.

It will be noted that sparging 28, 28A takes place after recycle water 29 has been cooled 15 as oxygen is more soluble in cooler water.

Figure 2:
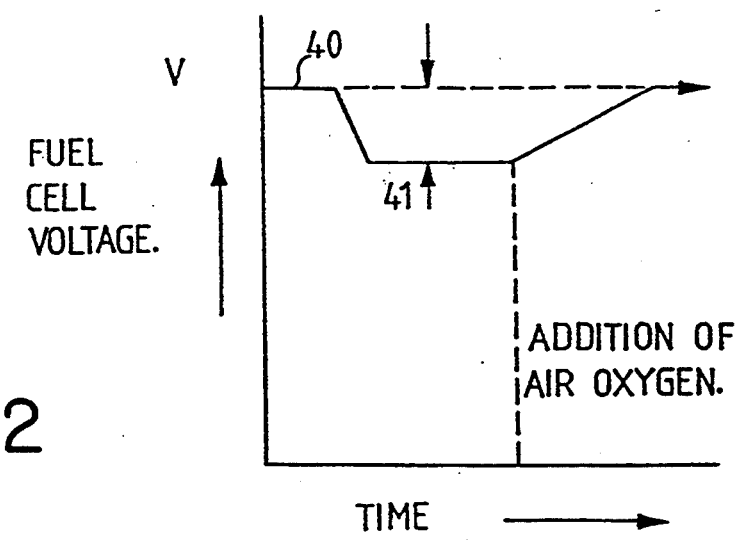
FIG. 2 is a plot of fuel cell output voltage against time during a transient from one output level to another.

In the method described above, the use of chemical and physical purification processes to reduce the presence of the carbon monoxide to very low levels in combination with the continuous addition of a low concentration of oxygen results in the optimum power output 40 from fuel cell 12 for any given set of fuel and air feed conditions. Experimental work has shown (FIG. 2) that under transient conditions, increased quantities of carbon monoxide are produced which result in a small loss 41 of output voltage 40 when conditions stabilise at the new flow rates. If oxygen is then specifically added the carbon monoxide is oxidised and the original voltage 40 restored.

Figure 3:
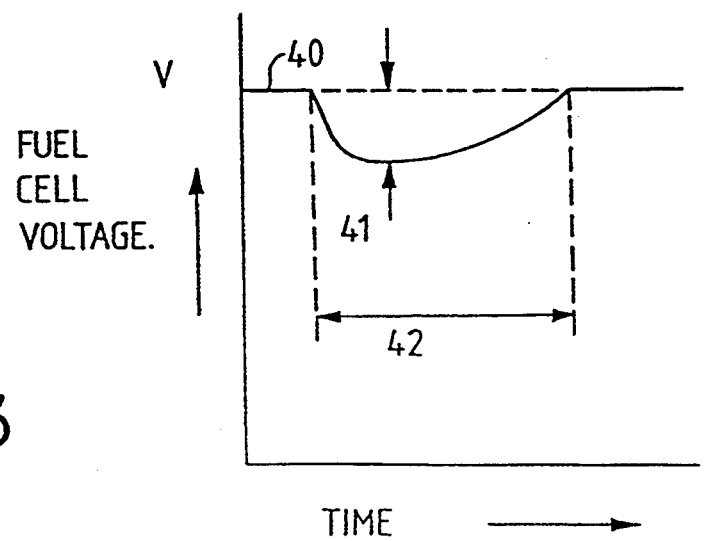
FIG. 3 is a plot of fuel cell output voltage against time during a transient from one output power level to another, showing voltage recovery after a short time.
Figure 4:
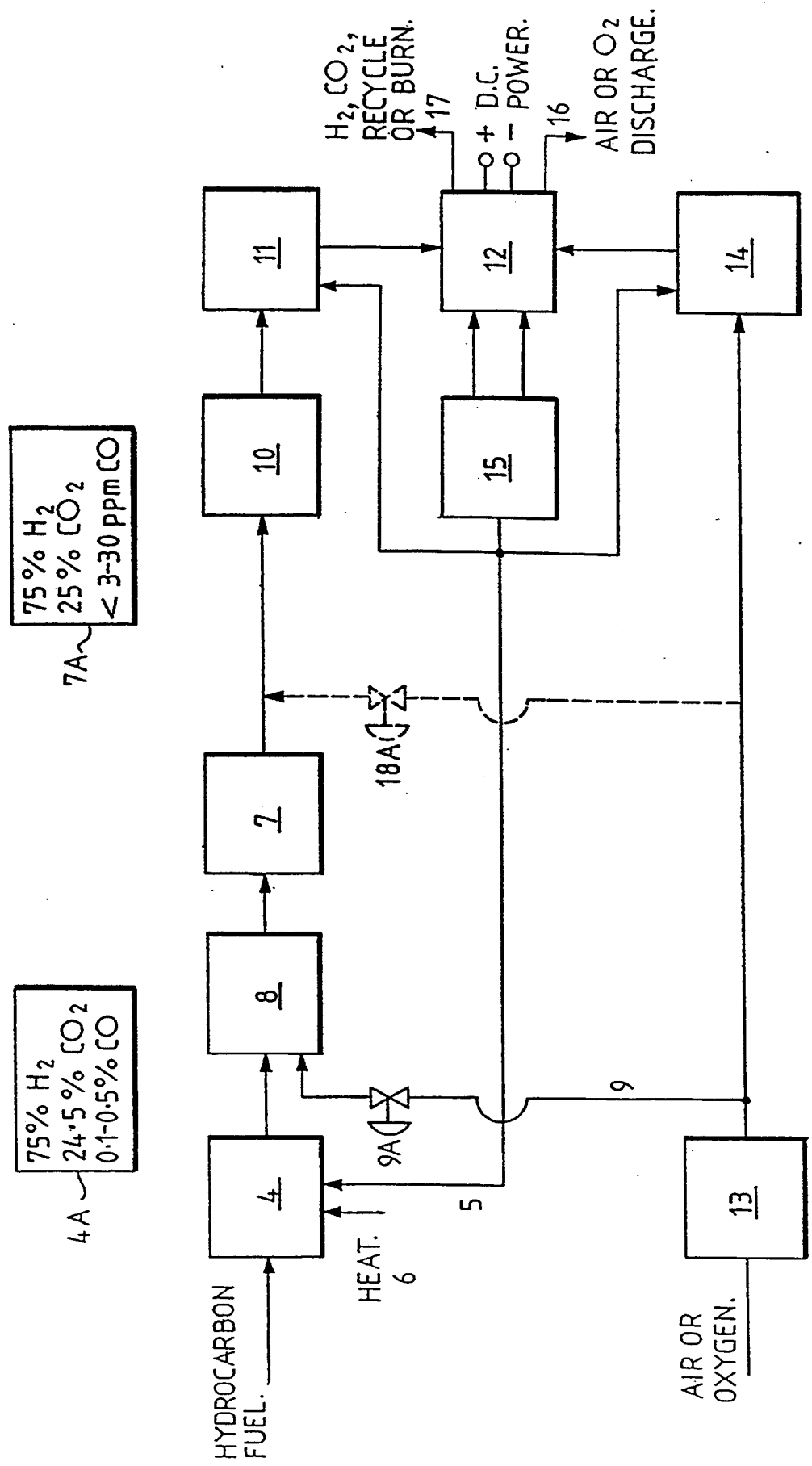
FIG. 4 is a flow diagram of a preferred design of fuel cell power system.

However, in specific tests, using apparatus similar to that of the invention, it was found that, without specific extra addition of gaseous oxygen, the fall in voltage 41 was gradually restored (FIG. 3). A detailed study of the process led to the identification of the role of dissolved oxygen and the development of the apparatus of the disclosure to optimise this effect, i.e. to minimise the level of fall 41 and the time 42 to restore full voltage 40.

The apparatus and method of the invention have been optimised to produce an oxygen concentration of low ppm levels.

When a transient occurs up to 30 ppm carbon monoxide may be present after purification 8, 7, but these conditions should last for only a few seconds until steady state is re-established and the oxygen level drops back to about 3 ppm. With an oxygen level of 5 ppm, the drop 41 can be eliminated over, say, one or two minutes but if the oxygen concentration is increased to 10 ppm, e.g. by sparging 28, 28A, voltage 40 can be restored in, perhaps, under half a minute.

The fall in voltage 41 may be used to trigger sparging 28, 28A and power may also be drawn from a back up battery to make up any temporary short fall. In this way, the power using equipment such as, for example, a television, can continue to operate normally during the transient and the control system (not shown but indicated by item 28C) may be fully automatic.

An important feature of the present invention is that the carbon monoxide level in the reformed fuel gas is reduced to very low levels, e.g. less than 30 ppm, from the conventional production levels of 0.1–0.5% (1,000–5,000 ppm) which occur even in a well controlled process. This is only possible if a selective oxidation means 8 is used in the presence of additional oxygen 9. The catalyst preferred is a mixture of noble metals and suitable metallic compounds on an appropriate substrate. As the reaction occurs when the carbon monoxide is adsorbed onto the catalyst, a large catalyst surface area is required. Thus the catalyst may, for example, be in the form of pellets. Catalysts of this type are used for the selective removal of carbon monoxide from reformed hydrocarbons in the production of ammonia, but it is submitted that the application to fuel cells is not previously known.

The apparatus and method of the invention have the following advantages when applied to a fuel cell power generation system:

i) Only the minimum of extra oxygen is added to the fuel, i.e. the order of 1.7×stoichiometric requirements.

ii) Steady low level of oxygen addition is easy to control with no risks of significant fluctuations.

iii) Risk of explosion due to excessive oxygen levels is negligible (an explosion in the fuel cell would be likely to burst the membrane, rendering the cell unusable).

iv) No likelihood of high concentrations of carbon monoxide building up.

v) Heat production, due to excessive oxidation of carbon monoxide is minimised (this could cause local drying of the fuel cell membrane and damage to it).

vi) Excess oxygen is negligible in comparison to 750,000 ppm of hydrogen. (Where no purification is used, the level of carbon monoxide production would be 0.1–0.5%, requiring the addition of 1–2% of oxygen and consequently an effective loss of 2–4% of the hydrogen fuel produced).

vii) Maximisation of efficiency of the fuel cell catalyst. (As the oxidation of carbon monoxide must take place on the surface of the catalyst, some active sites will inevitably be 'blocked' by carbon monoxide rather than being available for hydrogen adsorption and the electric power producing reaction. Thus, with this disclosure, the number of blocked sites can be reduced by a factor of 300–1700).

Figure 9:
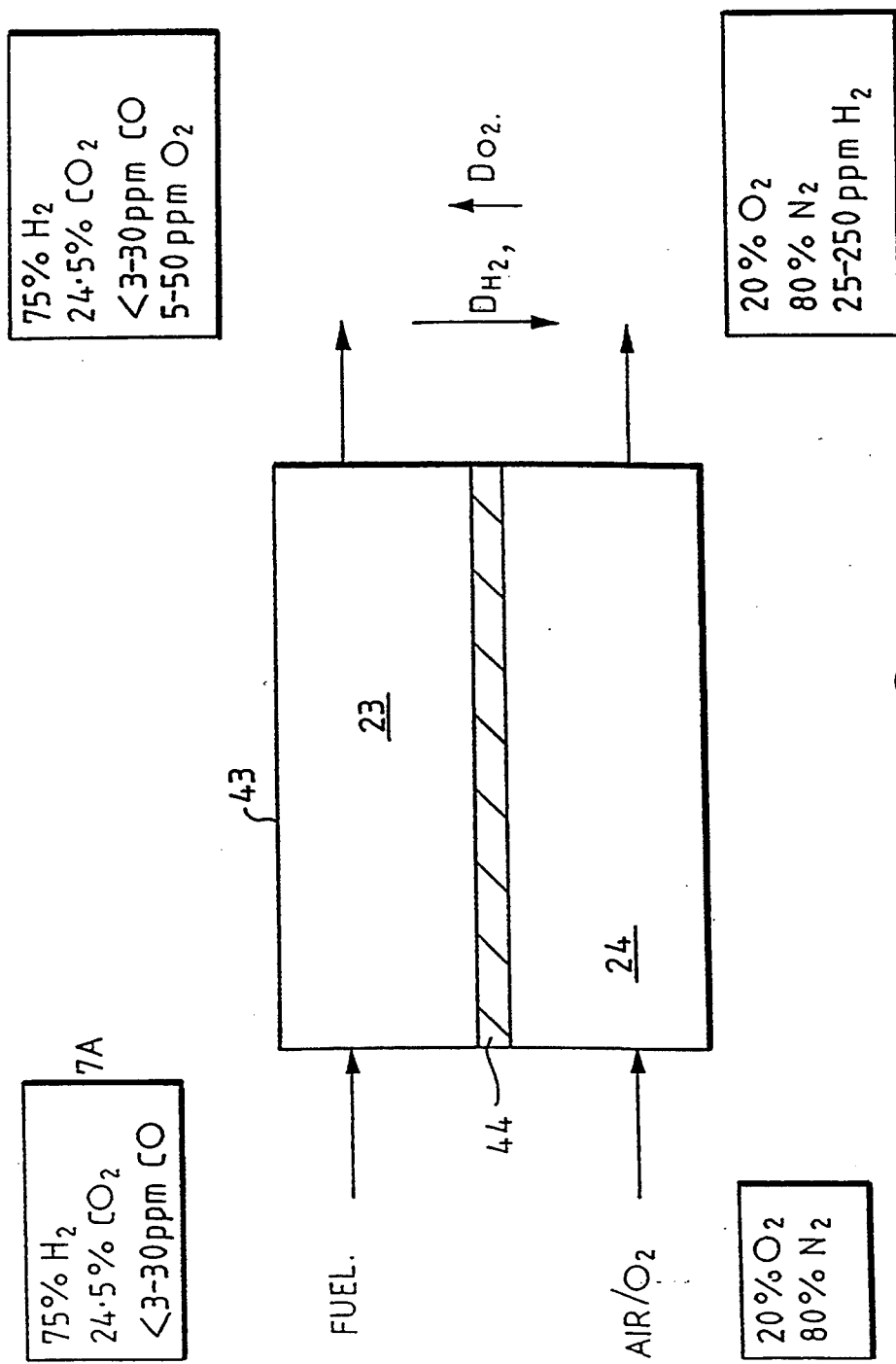
FIG. 9 is a flow diagram showing diffusion of hydrogen and oxygen across a membrane 44.

In a variation of the principle, the reformed fuel gas and air (or oxygen) gases may pass though a chamber 43 in which they are separated by a single permeable membrane 44. As shown in FIG. 9, both gases can diffuse across the membrane 44. As hydrogen has a smaller atomic volume than oxygen, its rate of diffusion into the air flow is, ordinarily, greater than that of oxygen into the hydrogen. However, this may be of relatively minor importance if the two diffusion rates were not too different. For example, if the rate of hydrogen diffusion was, say, five times that of oxygen, for every 5 ppm of oxygen passing into the hydrogen, 25 ppm of hydrogen would diffuse into the oxygen. This may be acceptable in a practical design of fuel cell. The relative diffusion rates can be adjusted by, for example, maintaining a pressure differential across membrane 44, i.e. the air/oxygen may be at a slightly higher pressure than the reformed fuel gas. Alternatively, membranes or surface treatments may be used which favour oxygen diffusion in preference to that of hydrogen.

A chamber 43 may be used upstream of catalytic oxidiser 8 for the addition of oxygen 9 as well as downstream of it to facilitate the removal of the residual parts per million quantity of carbon monoxide. FIG. 9 shows in the flow boxes the approximate percentage (or partial pressures) of both gas mixtures entering and leaving chamber 43 when set up to remove the residual carbon monoxide, assuming that the effective diffusion rate for hydrogen is five times that for oxygen. This ratio of five would make addition of oxygen directly after reformer 4 inefficient, i.e. if there were no purification 8, 7. The reason is that the 0.1–0.5% carbon monoxide impurity level would require 0.4–2.0% oxygen to remove it and provisions of this level of oxygen would mean counter diffusion of 2–10% of hydrogen.

We claim:

1. A method of processing fuel gas for a fuel cell including the steps of (i) primary selective catalytic oxidation of carbon monoxide contained in a reformed fuel gas flow (ii) secondary selective catalytic oxidation of remaining carbon monoxide contained in the reformed fuel gas flow, wherein small quantities of oxygen for the secondary selective catalytic oxidation are provided by providing a first oxygen permeable membrane, and passing the reformed fuel gas over a first side of said first membrane, providing an oxygen supply on the second side of the said membrane and allowing oxygen to diffuse across the said membrane into the reformed fuel gas.

2. A method as claimed in claim 1 further comprising providing quantities of oxygen for the primary selective catalytic oxidation by providing a second oxygen permeable membrane, passing the reformed fuel gas over a first side of the second oxygen permeable membrane, providing an oxygen supply at the second side of the said second membrane and allowing oxygen to diffuse across the membrane.

3. A method as claimed in claim 1 wherein the primary selective catalytic oxidation is effected with a catalyst adapted to adsorb carbon monoxide preferentially with respect to hydrogen.

4. A method as claimed in claim 1 wherein the secondary selective catalytic oxidation is effected with a fuel cell catalyst.

5. A method as claimed in any of claim 1 wherein the oxygen is supplied to the second side of the first membrane by means of an oxygenated liquid.

6. A method as claimed in claim 5 wherein the oxygenated liquid is water.

7. A method as claimed in claim 5 wherein the oxygenated liquid is water supplied from that produced by the fuel cell.

8. A method as claimed in claim 1 including the step of humidifying the oxygen fuel supply, which step comprises providing a third oxygen permeable membrane, intimately contacting a first side of said third membrane with said oxygen fuel supply, intimately contacting a second side of said third membrane with water and allowing water to pass across the membrane.

9. A method as claimed in claim 8 wherein oxygen passes across the membrane in an opposite sense to the water, to oxygenate the water.

10. An apparatus for processing fuel gases for a fuel cell comprising:
    first oxidation means, including a first catalyst, for effecting primary selective catalytic oxidation of carbon monoxide in a reformed fuel gas flow,
    second oxidation means, including a second catalyst, for effecting secondary selective catalytic oxidation of residual carbon monoxide in the reformed fuel gas flow and,
    a first oxygen permeable membrane and means for supplying oxygen to the membrane, wherein the first oxygen permeable membrane is in intimate contact on a first side thereof with the reformed fuel gas before the reformed fuel gas enters the second oxidation means and is in intimate contact on a second side thereof with the oxygen supply.

11. An apparatus as claimed in claim 10 wherein the first oxygen permeable membrane is disposed downstream, with respect to the reformed fuel gas flow, of the first oxidation means and upstream of the second oxidation means, the apparatus further includes a second oxygen permeable membrane disposed upstream of the first oxidation means and a means for supplying oxygen to the second permeable membrane, and wherein a first side of the second permeable membrane is in intimate contact with the reformed fuel gas and the second side of the second permeable membrane is in intimate contact with the oxygen supply.

12. An apparatus as claimed in claim 10 wherein the first catalyst is adapted to adsorb carbon monoxide preferentially with regard to hydrogen.

13. An apparatus as claimed in claim 10 wherein the second catalyst is the catalyst in the fuel cell.

14. An apparatus as claimed in claim 10 wherein the means for supplying oxygen comprises an oxygenated liquid which liquid is in intimate contact with the second side of the first oxygen permeable membrane.

15. An apparatus as claimed in claim 14 wherein the oxygenated liquid is water.

16. An apparatus as claimed in claim 14 wherein the oxygenated liquid is water supplied from that produced in the fuel cell.

17. An apparatus for processing fuel gases comprising:
    first oxidation means, including a first catalyst, for effecting primary selective catalytic oxidation of carbon monoxide in a reformed fuel gas flow,
    second oxidation means, including a second catalyst, for effecting secondary selective catalytic oxidation of residual carbon monoxide in the reformed fuel gas flow,
    a first oxygen permeable membrane and means for supplying oxygen to the membrane, wherein the first oxygen permeable membrane is in intimate contact on a first side thereof with the reformed fuel gas before the reformed fuel gas enters the second oxidation means and is in intimate contact on a second side thereof with the oxygen supply,
    and means for humidifying an oxygen fuel supply, said means comprising a further oxygen permeable membrane which further membrane is in intimate contact on a first side thereof with the oxygen fuel supply and which is in intimate contact on the second side thereof with water.

18. An apparatus as claimed in claim 17 wherein the first oxygen permeable membrane is disposed downstream, with respect to the reformed fuel gas flow, of the first oxidation means and upstream of the second oxidation means, the apparatus further includes a second oxygen permeable membrane disposed upstream of the first oxidation means and a means for supplying oxygen to the second permeable membrane, and wherein a first side of the second permeable membrane is in intimate contact with the reformed fuel gas and the second side of the second permeable membrane is in intimate contact with the oxygen supply.

19. An apparatus as claimed in claim 17 wherein the first catalyst is adapted to adsorb carbon monoxide preferentially with regard to hydrogen.

20. An apparatus as claimed in claim 17 wherein the second catalyst is the catalyst in the fuel cell.

21. An apparatus as claimed in claim 17 wherein the means for supplying oxygen comprises an oxygenated liquid which liquid is in intimate contact with the second side of the first oxygen permeable membrane.

22. An apparatus as claimed in claim 21 wherein the oxygenated liquid is water.

23. An apparatus as claimed in claim 21 wherein the oxygenated liquid is water supplied from that produced in the fuel cell.

24. An apparatus as claimed in claim 17 wherein the oxygen fuel supply is in the form of air or substantially pure oxygen.

25. An apparatus as claimed in claim 17 wherein water passes across the further oxygen permeable membrane from the second side to the first side and evaporates into the oxygen fuel supply.

26. An apparatus as claimed in claim 17 wherein oxygen passes across the further oxygen permeable membrane from the first side to the second side, thereby to oxygenate the water.

27. An apparatus as claimed in claim 17 wherein the first membrane and the further membrane are in intimate contact on their respective second sides with the same water flow.

28. An apparatus as claimed in claim 27 wherein the apparatus includes a first humidifier including the first oxygen permeable membrane and a second humidifier including the further oxygen permeable membrane and wherein the first humidifier is disposed downstream, with respect of the water flow, of the second humidifier.

29. An apparatus as claimed in claim 27 including a single humidifier which humidifier includes both the first and further oxygen permeable membranes and wherein the water flows in a space defined between first and third membranes.

30. An apparatus as claimed in claim 15 wherein the oxygen in the water is supplemented by sparging air or oxygen into said water upstream of the first oxygen permeable membrane.

31. An apparatus as claimed in claim 22 wherein the oxygen in the water is supplemented by sparging air or oxygen into said water upstream of the first oxygen permeable membrane.

* * * * *